United States Patent
Mallya et al.

(10) Patent No.: US 7,023,600 B2
(45) Date of Patent: Apr. 4, 2006

(54) SWITCHABLE ELECTRO-OPTICAL LAMINATES

(75) Inventors: Prakash Mallya, Sierra Madre, CA (US); Yi-Hung Chiao, Temple City, CA (US); David N. Edwards, Arcadia, CA (US); Kal Li, Diamond Bar, CA (US); Xin-Jiu Wang, Covina, CA (US); Sriram Venkatasanthanam, Chino Hills, CA (US); Nagarajan Srivatsan, Pasadena, CA (US); Pradeep Iyer, Hacienda Heights, CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 10/975,173

(22) Filed: Oct. 28, 2004

(65) Prior Publication Data

US 2005/0083564 A1 Apr. 21, 2005

Related U.S. Application Data

(63) Continuation of application No. 10/401,974, filed on Mar. 27, 2003, now Pat. No. 6,963,435.

(60) Provisional application No. 60/398,064, filed on Jul. 24, 2002, provisional application No. 60/368,205, filed on Mar. 27, 2002.

(51) Int. Cl.
*G02B 26/00* (2006.01)
*G02B 1/01* (2006.01)
*C09K 19/52* (2006.01)

(52) U.S. Cl. ............... 359/238; 359/240; 359/245; 252/299.01; 349/88; 349/149

(58) Field of Classification Search ............ 359/238, 359/240, 245, 247, 248; 252/299.01; 349/88, 349/149, 151, 152, 169, 175

See application file for complete search history.

(56) References Cited

U.S. PATENT DOCUMENTS

| 4,536,060 | A | * | 8/1985 | Takamatsu et al. | 349/153 |
|---|---|---|---|---|---|
| 4,744,918 | A | | 5/1988 | Heppke et al. | 252/299.61 |
| 5,251,048 | A | | 10/1993 | Doane et al. | 359/51 |
| 5,384,067 | A | | 1/1995 | Doane et al. | 252/299.01 |
| 5,437,811 | A | | 8/1995 | Doane et al. | 252/299.01 |
| 5,466,496 | A | * | 11/1995 | Jin | 428/1.3 |
| 5,668,614 | A | | 9/1997 | Chien et al. | 349/115 |
| 5,668,651 | A | | 9/1997 | Yamada et al. | 349/156 |
| 5,691,795 | A | | 11/1997 | Doane et al. | 349/169 |
| 5,695,682 | A | | 12/1997 | Doane et al. | 252/229.01 |
| 5,748,277 | A | | 5/1998 | Huang et al. | 349/169 |

(Continued)

FOREIGN PATENT DOCUMENTS

JP 3-157620 11/1989

(Continued)

OTHER PUBLICATIONS

Wood et al., "5.1: Large Area, High Resolution Portable ZBD Display", SID 02 Digest, ISSN/002-0966X/02/3301-0022-$1.00+00 © 2002 SID, pp. 22-25.

(Continued)

*Primary Examiner*—Timothy Thompson
(74) *Attorney, Agent, or Firm*—Renner, Otto, Boisselle & Sklar, LLP

(57) ABSTRACT

The present invention is directed to an electrically switchable laminate construction for applications including smart windows, and other uses and applications in which light management is desired. The electro-optical laminate construction has scattering and transparent modes of operation for dynamically controlling electromagnetic radiation flow.

14 Claims, 3 Drawing Sheets

U.S. PATENT DOCUMENTS

| | | | |
|---|---|---|---|
| 5,766,508 A * | 6/1998 | Kawasumi et al. | 252/299.01 |
| 5,766,694 A | 6/1998 | West et al. | 427/510 |
| 5,929,960 A | 7/1999 | West et al. | 349/156 |
| 5,940,150 A | 8/1999 | Faris et al. | 349/16 |
| 6,049,366 A | 4/2000 | Hakemi et al. | 349/86 |
| 6,072,549 A | 6/2000 | Faris et al. | 349/16 |
| 6,108,062 A * | 8/2000 | Takeuchi et al. | 349/88 |
| 6,249,332 B1 | 6/2001 | Bryan-Brown et al. | 349/129 |
| 6,319,428 B1 | 11/2001 | Michot et al. | 252/500 |
| 6,429,961 B1 | 8/2002 | Harary et al. | 359/296 |
| 6,508,560 B1 | 1/2003 | Epstein et al. | 359/606 |
| 6,621,539 B1 * | 9/2003 | Nakamura | 349/110 |
| 6,674,504 B1 * | 1/2004 | Li et al. | 349/169 |
| 6,680,758 B1 * | 1/2004 | Faris | 349/1 |
| 2002/0084565 A1 * | 7/2002 | Dautartas et al. | 269/289 R |

FOREIGN PATENT DOCUMENTS

| | | |
|---|---|---|
| WO | WO 93/23496 | 11/1993 |
| WO | WO 98/38547 | 9/1998 |
| WO | WO 99/63400 | 12/1999 |
| WO | WO 00/60407 | 10/2000 |
| WO | WO 01/40853 | 6/2001 |
| WO | WO 02/42832 | 5/2002 |

OTHER PUBLICATIONS

Penterman et al., Letters to Nature, "Single-substrate liquid-crystal displays by photo-enforced stratification", Nature/vol. 417/May 2, 2002/www.nature.com, © 2002 Macmillan Magazines Ltd., pp. 55-58.

* cited by examiner

SWITCHABLE ELECTRO-OPTICAL LAMINATES

CROSS REFERENCE TO RELATED APPLICATION

This application is a continuation of U.S. patent application Ser. No. 10/401,974 filed on Mar. 27, 2003, now U.S. Pat No. 6,963,435, which claims benefit of 60/368,205 filed Mar. 27, 2002, and claims benfit of Ser. No. 60/398,064 filed Jul. 24, 2002.

FIELD OF THE INVENTION

The present invention is directed to an electrically switchable film construction for applications including smart windows, graphics, office partitions, green houses and other applications in which light management is desired. The electro-optical laminate construction has two or more of transparent, reflective, scattering and opaque modes of operation for controlling electromagnetic radiation on demand. The laminate construction can be customized to fit various applications.

BACKGROUND OF THE INVENTION

Electrically switchable structures also referred to as "intelligent" glazing structures, or "smart windows", have been used to control electromagnetic radiation in buildings and vehicles. Such structures have light transmission characteristics that can be electrically controlled during the course of the day, or year, in order to meet lighting needs, minimize thermal load on heating and/or cooling systems, and provide privacy within the interior spaces of buildings and vehicles.

There are two general categories of chromogenic switchable glazing or smart windows, namely: non-electrically activated switchable glazings and electrically activated switchable glazings. The non-electrically activated types of chromogenic switchable glazing are based on photochromics, thermochromics and thermotropics. The most common electrically activated types of chromogenic switchable glazing are based on polymer dispersed liquid crystals (PDLC), dispersed particle systems (DPS) and electrochromics.

Electro-optical laminate structures having total-reflection, semi-transparent and totally transparent modes of operation for improved control over the flow of electromagnetic radiation have been developed. Such structures comprise one or more cholesteric liquid crystal (CLC) electromagnetic radiation polarizing panels.

CLC polarizers are used in light valves and electro-optical glazing, or smart window constructions to control light. Such constructions typically comprise two rigid sheets of glass on either side of the CLC layer. The CLC layer comprises crosslinkable or polymerizable material mixed with non-crosslinkable liquid crystals and chiral dopants. Each sheet of glass is covered with a transparent, electrically conductive coating to which electrical connections are attached. The structure is typically mounted within a frame.

In the "normal" mode, the CLC layer appears opaque. The liquid crystals are oriented in multiple directions and scatter light striking the CLC layer, making the device appear opaque. When the device window is switched on, the electrical field between the two conductive coatings forces the liquid crystals to reorient themselves parallel to each other. The CLC layer then appears transparent, and light passes through the device without scattering. U.S. Pat. Nos. 5,437,811 and 5,691,795, and International Publications WO 93/23496 and WO 0060407 describe electro-optical structures that operate in the "normal" mode.

Electro-optical devices incorporating CLC polarizers may also be configured to operate in "reverse" mode, wherein the device initially appears clear and is switched to opaque. When no electrical field is applied to the CLC layer, light passes through the device without scattering. Upon application of the electrical field, the liquid crystals reorient themselves to scatter light. U.S. Pat. Nos. 5,437,811 and 5,691,795, and International Publication WO 93/23496 describe electro-optical structures that operate in the "reverse" mode.

Electro-optical laminate structures may also be configured to operate in "reflective" mode, wherein the device is electrically switched between low and high reflectivity. U.S. Pat. Nos. 5,251,048; 5,384,067; 5,668,614; 5,940,150 and 6,072,549 and International Publications WO 98/38547 and WO 99/63400 describe electro-optical structures that operate in "reflective" mode.

In "bistable" mode, the liquid crystals are stable in both the clear state and the scattering state. The electro-optical structure requires electrical power only during switching. Power is not required to maintain either the clear state or the scattering state. U.S. Pat. Nos. 5,691,795 and 5,748,277 describe "bistable" electro-optical structures.

There is a need for switchable electro-optical devices improved optical properties and increased stability. Additionally, there is a need for electro-optical laminate structures that can be readily customized to fit various applications.

SUMMARY OF THE INVENTION

In a first aspect, the present invention is directed to a bistable electro-optical device comprising: a first transparent flexible substrate, having an interior and exterior surface; a second transparent flexible substrate, having an interior and exterior surface; a transparent electrically conductive layer on the interior surface of each of the first and second flexible substrates; a cholesteric liquid crystal material comprising a nematic liquid crystal material having negative dielectric anisotropy, a chiral dopant and an ionic additive, wherein the cholesteric liquid crystal material is positioned between the electrically conductive layers of the first and second transparent flexible substrates; wherein the first and second transparent flexible substrates are spaced apart a predetermined distance.

In another aspect of the present invention, the electro-optical device includes a liquid crystal material comprising a polymer network having cholesteric liquid crystals stabilized and supported therein. In one embodiment, the polymer network is formed from a polymerizable monomer or polymer having more than one functional group.

The electro-optical laminate structure of the present invention may include a grating surface adjacent to the CLC material for alignment of the liquid crystals.

In one embodiment, the CLC layer of the electro-optical laminate structure comprises individual cells having cell walls. Both the CLC material within the cells and the cell walls respond to an applied electrical field.

In one embodiment of the invention, the electro-optical laminate structure has a protective layer on at least one of the exterior surfaces of the transparent substrate.

The electro-optical laminate structure can be mounted within a rigid frame and applied to an existing window structure to control light impinging or passing through the window structure. The electro-optical laminate structures are useful for applications in homes, schools, offices, factories, as well as in automobiles, airplanes and trains to provide privacy, brightness control, and to reduce thermal loading on heating and cooling systems employed therein.

The electro-optical laminate structure may be provided in a roll configuration. In addition, the glazing structure may be supplied in a long, continuous sheet that can be cut to any desired dimension. This configuration enables easy customization of electro-optical laminate structure for light management application.

DETAILED DESCRIPTION OF THE INVENTION

Figure 1:
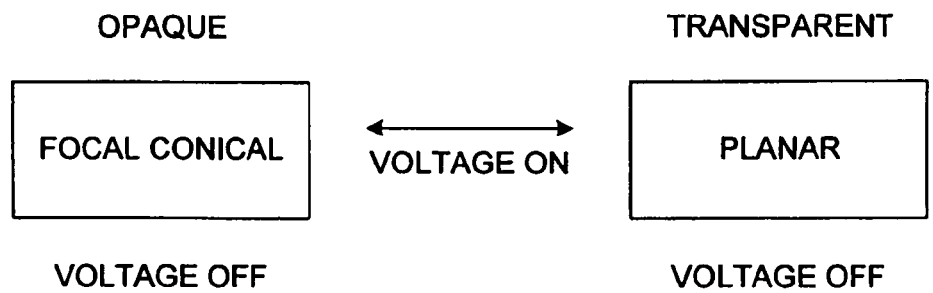
FIG. 1 is a diagram illustrating electrical switching of the electro-optical device between the focal conical and planar texture.

The laminate structures of the present invention are electrically switched between an opaque state and a transparent state. In the opaque state, the CLC molecules scatter light because the helically twisted molecules have randomly oriented axes. This is known as a focal conical texture. In the transparent state, the CLC molecules are aligned parallel to the substrate. No reflecting or scattering of light in the visible spectrum occurs. This is known as a planar texture. In a bistable device as shown in FIG. 1, the CLC molecules are switched from the focal conical texture to the planar texture by applying an electric field to the CLC material. The planar structure is maintained (stabilized) when the electric field is removed. By applying an electric field to the CLC molecules in the planar texture, the CLC molecules are switched back to the focal conical texture. The focal conical texture is maintained when the electric field is removed.

Figure 2:
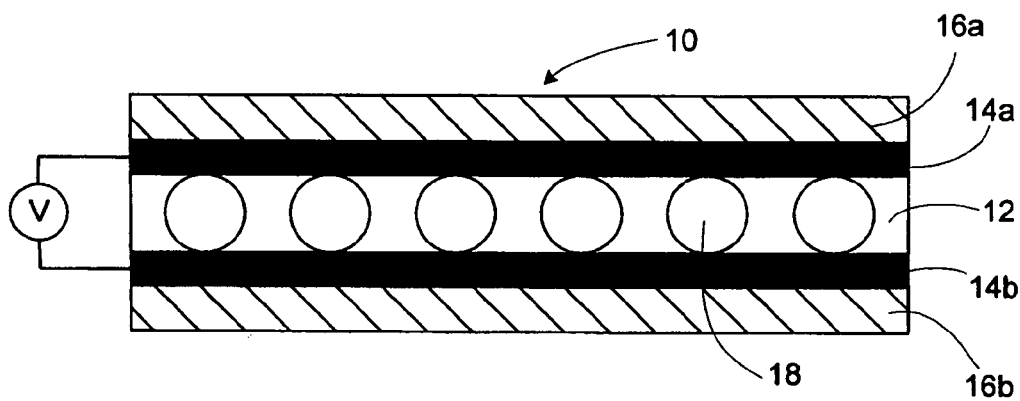
FIG. 2 is a cross-sectional view of a switchable laminate of the present invention, including two transparent film substrates.

Referring to FIG. 2, the illustrative embodiment of the electro-optical laminate structure of the invention will be described. The electro-optical laminate structure 10 generally comprises a CLC material 12 interposed between a pair of optically-transparent electrically-conductive layers 14a and 14b supported upon a pair of spaced-apart transparent, flexible polymeric films 16a and 16b, respectively, the perimeter edges of which are sealed, and across which a voltage is applied under the control of a microcontroller (not shown). Spacers 18 may be including within CLC material 12 to maintain the space between the optically transparent electrically-conductive layers 14a and 14b.

The flexible polymeric films 16a and 16b are transparent. As used herein the term "transparent" means that the film does not absorb a significant amount visible radiation and does not reflect a significant amount of visible radiation, rather, it is transparent to visible radiation. Examples of polymer films useful as the flexible substrate layer include films made of polyolefin, polyester, polyvinyl chloride, polyvinyl fluoride, polyvinylidene difluoride, polyvinylidene chloride, polyacrylate, polycarbonate, polyurethane, etc., and combinations thereof. In one embodiment, the flexible films comprise PET films.

In one embodiment, the transparent substrates 16a and 16b comprise glass panels. In another embodiment, the transparent substrates comprise rigid polymeric films.

The transparent electrically conductive layers 14a and 14b may comprise indium tin oxide (ITO), silver, zinc oxide or other optically transparent conductive polymer or like film coating. Chemical vacuum deposition, chemical vapor deposition, evaporation, sputtering, or other suitable coating techniques may be used for applying the conductive layer 14 to the flexible polymeric film 16. In addition, commercially available inorganic conductive polymeric films, including ITO coated polyethylene terephthalate (PET) film from Sheldahl, Inc., may be used.

Conductive organic or polymeric films may also be used. These conductive materials can be coated onto the flexible film substrates by known processes, including conventional wet coating, spray coating, dip coating, printing, screen printing and lamination. Commercially available transparent conductive polymeric films include Orgacon EL polyethylene dioxithiophene (PEDOT) films from Agfa-Gevaert. The transparent conductive film substrate may also have a coating or barrier layer thereon to reduce oxygen and/or moisture permeation into the glazing structure.

In one embodiment, the conductive layers are treated to provide for surface alignment of the liquid crystal molecules parallel to the plane of the flexible transparent films, e.g., by providing the conductive layers with rubbed polyimide layers, sputtered $SiO_x$, PEDOT, or treating them with a surfactant or chemicals. This has the effect of improving transmission and response time in some glazing structures in the field-off condition. In some applications, no alignment layer is required.

Electrical leads are attached to the conductive layers 14a and 14b. A voltage source is shown connected to the conductive layers in order to switch the CLC layer between different optical states by application of an electric field pulse. The voltage source may be an AC voltage source or a DC-AC inverter and a battery. In addition, the switching power may be supplied by a photovoltaic device that converts solar power to electrical power.

In one embodiment, the CLC material 12 comprises nematic liquid crystals, a chiral dopant and an ionic additive. The CLC material may also include a polymer matrix formed from a polymerizable monomer or polymer. The polymer matrix stabilizes or supports the nematic liquid crystals.

Suitable nematic liquid crystals and chiral additives are commercially available and would be known to those skilled in the art in view of this disclosure.

Suitable chiral nematic (i.e., cholesteric) liquid crystals materials are disclosed in, for example, U.S. Pat. No. 6,049,366, International Publications WO 00/60407, WO 99/6340 and WO 98/38547, the entire disclosures of which are incorporated herein by reference. Specific nematic liquid crystalline materials include: p-azoxyanisole, p-azoxyphenetole, p-butoxybenzoic acid, p-methoxy-cinnamic acid, butyl-p-anisylidene-p-aminocinnamate, anisylidene p-amino-phenylacetate, p-ethoxy-benzal-amino-α-methyl-cinnamic acid, 1,4-bis(p-ethoxybenzylidene)cyclohexanone, 4,4'-dihexyloxybenzene, 4,4'-diheptyloxybenzene), anisal-p-amino-azo-benzene, anisaldazine, α-benzene-azo-(anisal-α'-naphthylamine), n,n'-nonoxybenzetoluidine; anilines of the generic group (p-n-alkoxybenzylidene-p-n-alkylanilines), such as p-methoxybenzylidene p'-n-butylaniline, p-n-butoxybenzylidene-p'-aminophenylacetate, p-n-octoxybenzylidene-p'-aminophenylacetate, p-n-benzylideneproprionate-p'-aminophenylmethoxide, p-n-anixylidene-p'-aminophenylbuterate, p-n-butoxybenzylididene-p'-aminophenylpeatoate and mixtures thereof. Conjugated cyano-organic compounds include 7,7', 8,8'-tetracyanoquinodimethane (TCNQ), (2,4,7,-trinitro-9-fluorenylidene)-malono-nitrile (TFM), p-[N-(p'-methoxy-benzylidene)amino]-n-butyl-benzene (MBBA), p-[N-(p'-ethoxybenzylidene)amino]-butylbenzene (EBBA), p-[N-(p'-methoxybenzylidene)amino]phenyl butyrate n-butyl-p-(p'-ethoxyphenoxycarbonyl)phenylcarbonate, p-methoxy-p'-n-butylazoxybenzene, p-ethoxy-p'-n'-butylazobenzene, p-[N-(p'-methoxybenzylidene)amino]benzonitrile (BBCA), p-[N-(p'-methoxybenzylidene)amino]benzonitrile (BBCA), p-[N-(p'-hexylbenzylidene)amino]benzonitrile (HBCA), pentylphenylmethoxy benzoate, pentylphenylpentyloxy benzoate, cyanophenylpentyl benzoate, cyanophenylheptyloxy benzoate, cyanophenyloctyloxy benzoate, cyanophenylmethoxy benzoate, and the like.

Nematic liquid crystals frequently comprise cyanobiphenyls, and may be mixed with cyanoterphenyls and with various esters. There are commercially available nematic type liquid crystal mixtures, such as liquid crystal mixture "E7" (Licrilite™ BL001 from E. Merck, Darmstadt, Germany, or its subsidiaries such as EM Industries, Hawthorne, N.Y. and Merck Industrial Chemical, Poole, England) that is a mixture of (by weight), 51% 4'-n-pentyl-n-cyanobiphenyl (5CB), 21% 4'-n-heptyl-n-cyanobiphenyl (7CB), 16% 4'-n-octoxy-4-cyanobiphenyl, 12% and 4'-n-pentyl-4'-n-pentyl-4-cyanoterphenyl that has a crystal to nematic liquid crystal phase transition temperature of −10° C. and a liquid crystal to isotropic phase transition temperature of 60.5° C.

Illustrative of other such commercial liquid crystal mixtures are the following: E-31 is a proprietary mixture of cyanobiphenyls and a non-cyano biphenyl ester available from E. Merck, supra, and having a crystal to nematic crystal phase transition temperature of −9° C. and a liquid crystal to isotropic phase transition temperature of 61.5° C. E-44 is a proprietary mixture of cyanobiphenyls, a cyanoterphenyl and a non-cyano biphenyl ester available from E. Merck, supra, and having a crystal to nematic liquid crystal phase transition temperature of −60° C. and a liquid crystal to isotropic phase transition temperature of 100° C. E63, from E. Merck, supra, is a liquid crystal mixture that is similar to the E7 with added cyclohexanes. It contains: significant amounts of the commonly known liquid crystal component 5CB, 7CB, lesser amounts of 5CT, lesser amounts of Benzonitrile-4-(4 propyl-1-cyclohexen-1-yl), commonly known as PCH3, lesser amounts of 4-carbonitrile-4'(4-pentyl-1-cyclohexen-1-yl)-1,1'-biphenyl, commonly known as BCH5, and still lesser amounts of [1,1'-Biphenyl]-4-carboxylic acid, 4'-heptyl-4'-cyano[1,1'-biphenyl]-4-yl ester, commonly known as DB71. K-12 is 4-cyano-4'-butylbiphenyl and has a crystal to nematic liquid crystal phase transition temperature of 48° C. K-18 is 4-cyano-4'-hexylbiphenyl and has a crystal to nematic liquid crystal phase transition temperature of 14.5° C. and a liquid crystal to isotropic phase transition temperature of 29° C. K-21 is 4-cyano-4'-heptylbiphenyl and has a crystal to nematic liquid crystal phase transition temperature of 30° C. K-24 is 4-cyano-4'-octylbiphenyl and has a crystal to smectic A liquid crystal phase transition temperature of 21.5° C., a smectic C to nematic liquid crystal phase transition temperature of 33.5° C. and a nematic liquid crystal to isotropic phase transition temperature of 40.5° C. M-15 is 4-cyano-4'-pentoxybiphenyl and has a crystal to nematic liquid crystal phase transition temperature of 48° C. and a liquid crystal to isotropic phase transition temperature of 68° C. M-18 is 4-cyano-4'-hexoxybiphenyl and has a crystal to nematic liquid crystal phase transition temperature of 57° C. and a liquid crystal to isotropic phase transition temperature of 75.5° C. M-24 is 4-cyano-4'-octoxybiphenyl and has a crystal to smectic A liquid crystal phase transition temperature of 54.5° C., a smectic A to nematic liquid crystal phase transition temperature of 67.0° C. and a nematic to isotropic phase transition temperature of 80.0° C. Other Licrilite™ liquid crystal mixtures include BL003, BL004, BL009, BL011, BL012, BL032, BL036, BL037, BL045, BL046, ML-1001, ML-1002, as well as TL202, TL203, TL204 and TL205, all obtainable from E. Merck, supra.

TOTN404, available from Hoffman-LaRoche, Basel, Switzerland and Nutley, N.J., is a liquid crystal mixture similar to E7 but with added pyrimidines. It contains approximately 30 weight percent of 4-carbonitrile,4'-pentyloxy-1,1'-biphenyl commonly known as 5OCB, 14 weight percent of 4-carbonitrile,4'-octyloxy-1,1'-Biphenyl, commonly known as 8OCB, 10 weight percent of 4-carbonitrile-4''-pentyl-1,1',4',1''-terphenyl, commonly known as 5CT, 10 weight percent of 4-(4-pentyl-2-pyrimidimyl)-benzonitrile, commonly known as RO-CP-7035, 20 weight percent of 4-(4-heptyl-2-pyrimidimyl)benzonitrile, commonly known as RO-CP-7037, and 15 weight percent of 4-[5-(4-butylphenyl)-2-pyrimidinyl]benzonitrile, commonly known as RO-CM-7334.

ROTN-570, available from Hoffman-LaRoche is a cyanobiphenyl liquid crystal mixture comprises 51 weight percent of 4-cyano-4'-pentylbiphenyl, 25 weight percent of 4-cyano-4'-heptylbiphenyl, 16 weight percent of 4-cyano4'-octyloxy-biphenyl, and 8 weight percent of 4-cyano-4'-pentyl-p-terphenyl. Other desirable liquid crystal mixtures include TNO623 and TN10427, both from Hoffman-LaRoche.

Commercially available nematic liquid crystal materials from Slichem Liquid Crystal Company of China include 6F10100, and TEB50.

Useful chiral additives include cholesteryl halides, cholesteryl alkyl esters including cholesteryl acetate, cyanobiphenyl derivatives such as 4-cyano4'-(2-methyl) butylbiphenyl and C15 and CB15 from Merck. Useful chiral compounds also include ZLI-4571 and ZLI-4572 from Merck.

In one embodiment, the CLC material 12 comprises a polymer matrix having nematic liquid crystals stabilized or supported therein. The polymer matrix is generally formed by polymerization or crosslinking of at least one polymerizable monomer or crosslinkable polymer with non-reactive nematic liquid crystals, and a chiral additive. Polymerization of the liquid crystal mixture is initialized in any suitable manner, as by UV radiation, thermally, etc., depending upon the polymer used. The liquid crystal mixture may also contain a surfactant and/or dye.

In one embodiment, the cholesteric liquid crystal material comprises about 90–99% by weight nematic liquid crystal material, about 0.5–3% by weight of chiral dopant and about 0.05–0.5% by weight of ionic additive.

In one embodiment, the polymer matrix is formed from crosslinking a mixture of a crosslinkable polymer or monomer(s), a non-crosslinkable liquid crystal(s) and chiral dopant(s). A liquid crystal polymer stabilized cholesteric texture (PSCT) is formed when a small amount of a UV crosslinkable polymer in its liquid crystal phase and a photoinitiator are mixed with a cholesteric liquid crystal (CLC) whose pitch is tuned to the infrared region. The crosslinkable polymer concentration is typically in the range of about 0.1 to about 5.0% by weight of the total CLC mixture. U.S. Pat. Nos. 5,384,067; 5,437,811 and 5,691,795, and International Publication WO 00/60407, the entire disclosures of which are incorporated herein by reference, disclose such CLC mixtures. The monomer may be a UV polymerizable monomer such as ethylene glycol dimethacrylate. A surfactant may be included in the mixture to facilitate uniform coating and desired orientations of the CLC material within the electro-optical structure. The mixture is then cured by exposure to UV light while a voltage or a magnetic field is applied to align the liquid crystal as well as the polymer molecules in the direction across the device thickness. With the field applied during curing, the CLC molecules are aligned in a planar texture (transparent) after the curing. Subsequent application of an electric field switches the CLC molecules into a stable focal conical texture (opaque) that is maintained when the electric field is removed. The CLC material is formulated to have an intrinsic reflective wavelength in the infrared range, e.g., 0.7 to 2.0 microns.

Suitable crosslinkable polymer materials include UV curable, thermoplastic and thermosetting polymers. Examples of crosslinkable polymers include acrylate and methacrylates, vinyl ethers, hydroxyfunctionalized polymethacrylates, urethanes and epoxy systems. Particularly useful polymerizable materials include acrylate and methacrylate monomers.

In one embodiment, the cholesteric liquid crystal material comprises about 90–98% by weight of a nematic liquid crystal material, about 1–3% by weight of a chiral material and about 1–6% by weight of a polymerizable acrylate or methacrylate based resin material having two or more functional groups.

Useful photoinitiators include benzoin methyl ether, and the Irgacure family of photoinitiators including Irgacure 184, 369, 651, 819 and 907, and Darocure 1173 and 4205, all from Ciba Geigy, as well as other photoinitiators known to those in art.

In one embodiment, the CLC material is formed from a mixture comprising a polymerizable liquid crystal material, a non-polymerizable liquid crystal material and a chiral dopant. Polymerizable liquid crystals include polysiloxane liquid crystal material and acrylate liquid crystal compounds. Polysiloxane liquid crystal materials are commercially available from Wacker (Germany) and acrylate based liquid crystal materials are commercially available from BASF or EMI (Germany). Suitable non-polymerizable liquid crystal materials include single compound liquid crystals such as the K- and M-series from EMI (Germany) and multiple compound liquid crystals such as the E- and ZLI-series from EMI.

Dual Frequency Switching

Figure 3:
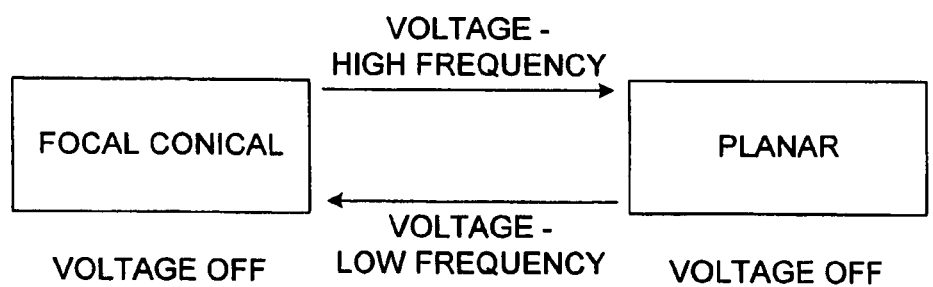
FIG. 3 is a diagram illustrating dual frequency switching of a bistable electro-optical device between the focal conical and planar texture.

In one embodiment, the CLC material comprises a dual frequency switchable CLC material. The CLC material comprises a mixture of a cholesteric liquid crystal material with a negative dielectric anisotropy, a polymerizable material, and charge transfer agents (both donor and acceptor) or a charge transfer complex, or ionic compounds or polar compounds. If the polymerizable material is a UV curable polymer or monomers, the CLC mixture also includes a photoinitiator. The CLC material has a threshold frequency, which is the point at which the liquid crystal material changes from one optical state to another. When an electric field having a frequency greater than the threshold frequency is applied to the CLC material, the liquid crystals align themselves parallel to the substrate in a planar texture. When an electric field having a frequency lower than the threshold frequency is applied to the CLC material, the electro-hydrodynamic instability of the liquid crystals causes the liquid crystal molecules to reorient to focal conical state causing the light to be scattered and the structure appears opaque. FIG. 3 illustrates the dual frequency switching of the bistable glazing structure of this embodiment. The polymerizable component of the CLC mixture helps control the bistability of the CLC material. Curing the polymerizable component in the presence of a high frequency electric field applied to the CLC material favors the transparent, planar texture. In order to favor the opaque, focal conical state the polymerizable component is cured in the presence of a low frequency electric field applied to the CLC material. The opaque state is also favored by curing the polymerizable component in the presence of a magnetic field or in the absence of any field.

Examples of useful charge transfer agents include, but are not limited to, the electron donors bis(ethylenedithio) tetrathiafulvalene, bis(methylenedithio) tetrathiafulvalene, bis(trimethylenedithio) tetrathiafulvalene, 4,4'-dimethyltetrathiafulvalene, tetrakis(octadecylthio) tetrathiafulvalene, tetrakis(n-pentylthio)tetrathiafulvalene, tetrakis (alkylthio)tetrathiafulvalene, tetrathiafulvalene, ferrocene, butylferrocene and tris(tetrathiafulvalene) bis(tetrafluoroborate); the electron acceptors bis(tetra-n-butylammonium) tetracyanophenoquinometanide, 2,5-dimethyl- 7,7,8,8-tetracyanoquinodimethane, 11,11,12,12-tetracyanonapth-2,6-quinodimethane, 7,7,8,8-tetracyanoquinodimethane, and tetracyanoquinodimethane; and charge transfer complexes obtained by reacting an electron donor with an electron acceptor. Such charge transfer complexes are described in U.S. Pat. No. 6,384,887, the entire disclosure of which is hereby incorporated by reference herein.

Useful ionic compounds include, but are not limited to, 1-heptyl-4(4-pyridyl) pyridinium bromide, 1-phenacyl pryridinium bromide, 2-propylisoquinolinium bromide, 2-propylisoquinolinium tetraphenyl borate, cetylpyridinium bromide, dodecyl pyridinium tetraphenyl borate, tetrabutyl ammonium bromide, tetrabutyl ammonium p-toluene sulfonate, tetrabutylammonium hexafluoro phosphate, tetrabutylammonium tetraphenyl borate, tetrahexadecylammonium bromide, tetrahexadecylammonium hexafluorophosphate, tetrakisdecylammonium bromide, tetrakisdecylammonium hexafluorophosphate, tetrahexadecylammonium tetraphenyl borate, tetrakisdecylammoniym tetraphenyl borate and mixtures thereof.

Useful polar compounds are those molecules with permanent dipoles and include, but are not limited to, singly- or multiply-substituted straight chain aliphatics, branched aliphatics, cyclic aliphatics, mononuclear or polynuclear aromatics, heteroaromatics, where the aromatic ring incorporates N, S, or O, and polynuclear heteroaromatics, metallocenes, and combinations thereof. The substitutions can be, but are not limited to, any one of the following functional groups: carboxylic acids, aldehydes, ketones, nitriles, isonitriles, halogens, esters, alcohols, thiols, alkyl, phenyl, biphenyl, and combinations thereof. Examples of specific polar compounds include acetone, chloroform, dichloromethane, 4-cyanobiphenyl, decanoic acid, 1-bromohexadecane, hexanophone, 4-hexylbenzoic acid, 2-pyridylacetonitrile, ferrocenecarboxylic acid, ferroceneacetonitrile.

In one embodiment, the electro-optical laminate structure comprises a bistable device in which the CLC material comprises a nematic liquid crystal, a chiral compound and an ionic additive. In another embodiment, the bistable device includes a CLC material comprising a nematic liquid crystal, a chiral compound, an ionic additive and a polymerizable monomer or polymer.

Dichroic Dyes

In one embodiment, the CLC material contains one or more dichroic dyes to make the glazing structure darker in its opaque state. In the homeotropic bright state, the dichroic dye molecules substantially follow the orientation of the surrounding liquid crystals, i.e., are aligned perpendicular to the substrate and thus perpendicular to the light polarization. Because of this alignment, the addition of the dichroic dye to the CLC does not substantially affect the transparency of the glazing. However, in the focal conical opaque state, the orientation of the dichroic dye molecules follow the helical structure of the cholesteric liquid crystals. Many of the dichroic dye molecules are aligned parallel to the substrate and thus parallel to the light polarization. In this state, the dichroic dye absorbs light significantly, and the opaque state of the glazing is darker.

The conductive layers 14a and 14b are physically spaced apart. In one embodiment, the spacing between the conductive layers is greater than about 10 microns. In another embodiment, the spacing is greater than about 15 microns, and in yet another embodiment, the spacing is about 20 microns. In a further embodiment, the spacing is about 25 microns. It is understood that such dimensions may vary from embodiment to embodiment of the invention.

In one embodiment, the CLC layer contains spacers 18. The spacers may comprise, for example, glass beads, sticky glass beads, polymeric microspheres and/or microfibers. In one embodiment, the spacers 18 comprise glass beads having an average diameter in the range of 5 to 50 microns. In another embodiment, the spacers comprise glass beads having an average diameter in the range of 10 to 30 microns.

In one embodiment, spacers 18 are printed or sprayed onto at least one of the conductive layers. In another embodiment, the spacers are micro-patterned onto at least one of the conductive layers by a micro-replication process or by a photo-lithographic process.

In another embodiment of the present invention, the CLC layer comprises encapsulated CLC material. The encapsulated CLC material can function as spacers, so that separate glass or polymeric spacers are not required.

In one embodiment, the CLC material comprises CLC pigments in an electrically active carrier fluid, such as low molecular weight nematic liquid crystal fluid. Such CLC materials are described in, for example, International Publication WO 98/38547, the disclosure of which is incorporated herein by reference.

Other embodiments of CLC materials are described in U.S. Pat. Nos. 5,251,048; 5,384,067; 5,437,811; 5,668,614; 5,695,682 and 5,748,277, the entire disclosures of which are incorporated herein by reference.

Grating Surface

Figure 4:
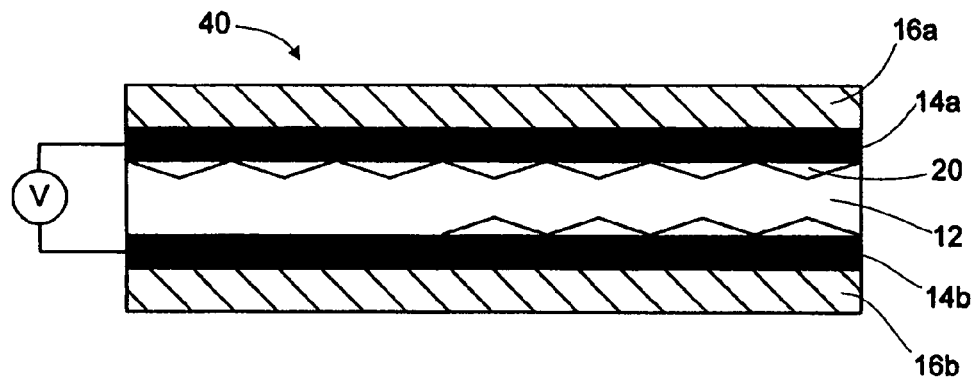
FIG. 4 is a cross-sectional view of the switchable laminate structure of FIG. 2 with a grating surface on one of the flexible film substrates.

In one embodiment, the glazing structure of the present invention includes a grating surface, also known as a ZBD device, on the inner surface of one or both of the transparent substrates. The grating surface comprises a plurality of small surface features, generally less than 15 microns in size. Such small surface features include grooves, protrusions, blind holes, and other surface profiles. The grating areas may be uniform or non-uniform in size, shape, and alignment directions, depending on the desired distortion effect. The grating surface is used for alignment and surface tilt. Examples of grating structures include those described in International Patent Publication WO 01/40853, the entire disclosure of which is hereby incorporated by reference herein. Referring to FIG. 4, the glazing structure 40 comprises CLC material 12 interposed between a pair of optically transparent electrically conductive layers 14a and 14b supported upon a pair of spaced-apart, transparent substrates 16a and 16b, respectively. Grating surface 20 can be applied to the inner surface of conductive layers 14a, and optionally 14b. Alternatively, conductive layer 14a may be applied to the inner surface of grating surface 20. In one embodiment, the grating surface is the conductive layer itself. For example, the grating surface can be formed on a layer of PEDOT by photolithography or by embossing the conductive layer. Other manufacturing techniques include scoring, printing, lithography, laser ablation and interferographic techniques. Spacers (not shown) are used to uniformly space apart substrates 16a and 16b. The spacers can be an integral part of the grating surface structure. For example, spacers can be formed by embossing simultaneously with the formation of the grating surface.

Figure 5:
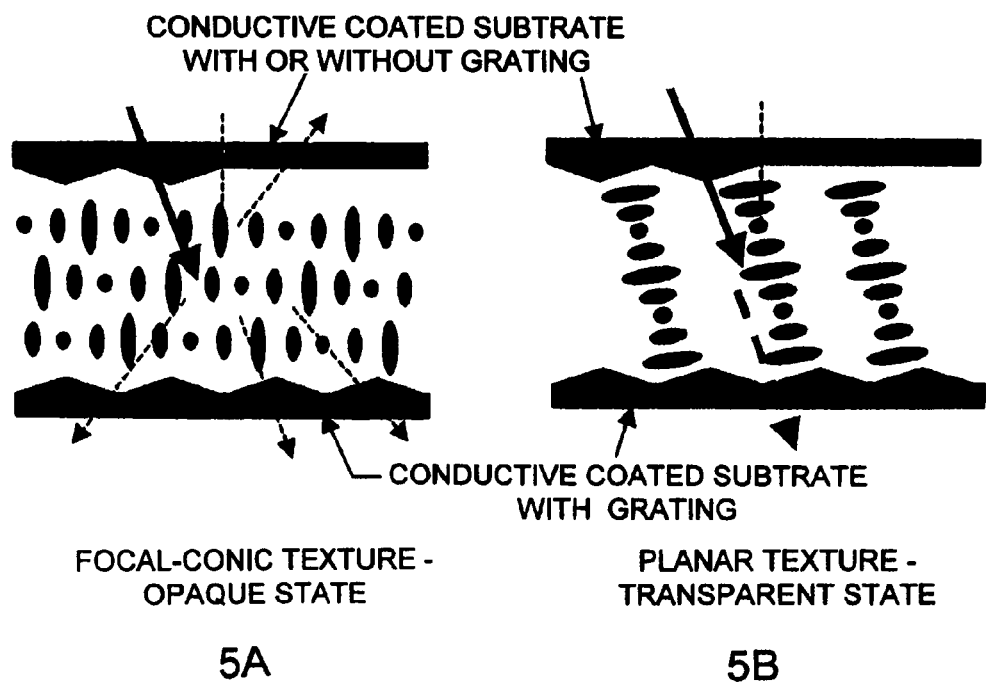
FIG. 5 is a cross-sectional view of the switchable laminate structure illustrating alignment of the CLC molecules.

With the grating surface, the surface alignment of the CLC molecules can be switched between a high tilt orientation and a low tilt orientation relative to the substrates. By changing the electric pulse polarity, the surface orientation of the CLC molecules is reversed. The CLC molecules in the vicinity of the grating surface will respond to the electric pulse polarity to align themselves with perpendicular (high tilt orientation) or parallel (low tilt orientation) to the substrate. Accordingly, the bulk CLC molecules adopt a texture of either the focal conic state where the CLC molecules on the grating surface are aligned high tilted, or the planar state where the CLC molecules on the grating surface are aligned low tilted. As shown in FIG. 5, the focal conic state scatters the light, making the panel appear opaque (5A). The planar state allows the incident light to pass through without loss when the helical pitch of the CLC molecules are selected to reflect light outside of the visible band (5B). By switching the polarity of the applied electric field, a change between the transparent state and the opaque state occurs.

Electro-Optical Structure with Individual Cells

Figure 6:
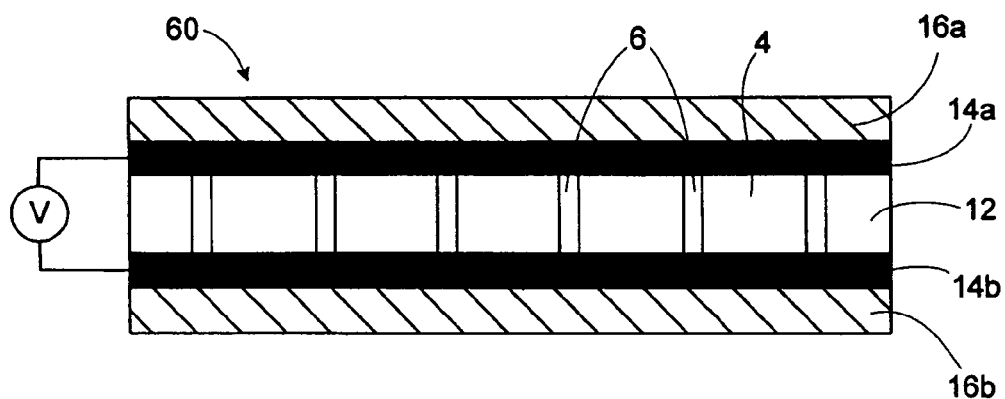
FIG. 6 is a cross-sectional view of the switchable laminate structure wherein individual cells are formed within the CLC layer.

In one embodiment, the CLC material is partitioned into distinct regions, or individual cells in accordance with a predetermined pattern. As shown in FIG. 6, the glazing structure 60 comprised CLC layer 12 interposed between a pair of optically-transparent electrically-conductive layers 14a and 14b supported upon a pair of spaced-apart transparent, flexible polymeric films 16a and 16b, respectively, the perimeter edges of which are sealed and across which a voltage is applied. Individual cells 4 are supported by walls 6, which extend the entire distance between films 16a and 16b (including conductive layers 14a and 14b). In one embodiment, the distance between the cell walls can be within the range of about 0.1 millimeters to about 10 millimeters. The width of the walls can be within the range of about 10 µm to about 1000 µm. Walls 6 facilitate cutting of the glazing structure 60 into any desired shape and dimension while minimizing liquid crystal leakage and preventing electrical shorting and delamination.

Figure 7:
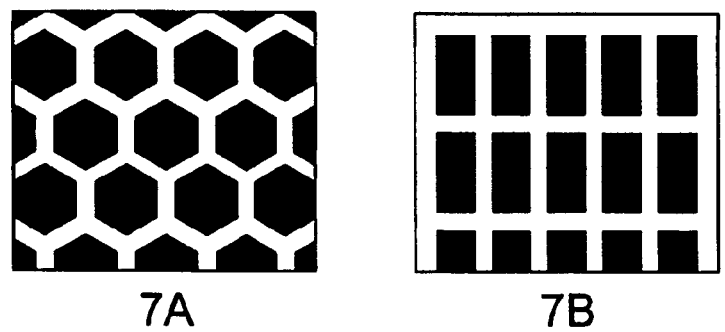
FIGS. 7A and 7B are top views of the switchable laminate structure with individual cells formed within the CLC layer.

In one embodiment, the CLC layer is formed from a mixture comprising liquid crystal material, at least one polymerizable monomer or crosslinkable polymer, and a photoinitiator. A two-stage polymerization process may be used to form the CLC layer. A photomask of a predetermined pattern is placed over the CLC mixture and exposed to radiation such as UV radiation. Examples of suitable patterns include those illustrated in FIGS. 7A and 7B.

Only in the irradiated regions does photopolymerization take place, and the subsequent decrease in the monomer content in the irradiated regions causes a gradient in monomer concentration. As a result, more photopolymerizable monomer diffuses into the irradiated regions displacing the CLC. The cell walls are formed in the irradiated regions. By adjusting the polymerizable monomer's diffusion coefficient, UV exposure intensity and time, the illumination dimensions, the polymer concentration in both the walls and cell areas can be controlled. A second exposure, a blanket exposure, i.e., without a mask, produces a polymer stabilized liquid crystal within the individual cells. Due to the low concentration of polymerizable monomer within the cells, the resulting polymer forms a network within which the CLC molecules are homogeneous and mobile. Within the cell walls, the polymer is more concentrated so that the polymer and CLC molecules are phase separated into domains. The CLC molecules are confined in droplets surrounded by the polymer. The walls of the cells, as well as the CLC material within the cells, respond to the externally applied electric field.

Examples of suitable photopolymerizable monomers include acrylic acid and methacrylic acid, esters thereof, each of which contains an alkyl group, an aryl group, or a cycloalkyl group including three or more carbon atoms, and halides thereof. Such photocurable monomers are, for example, isobutyl acrylate, stearyl acrylate, lauryl acrylate, isoamyl acrylate, 2-ethylhexyl acrylate, n-butyl methacrylate, n-lauryl methacrylate, tridecyl methacrylate; n-stearyl methacrylate, n-cyclohexyl methacrylate, benzyl methacrylate, isobornyl methacrylate, 2-phenoxyethyl methacrylate, 2,2,3,4,4,4-hexafluorobutyl methacrylate, 2,2,3,4,4,4-hexachlorobutyl methacrylate, 2,2,3,3-tetrachloropropyl methacrylate, 2,2,3,3-tetrachloropropyl methacrylate, perfluorooctylethyl methacrylate, perfluorooctylethyl acrylate, and perchlorooctylethyl methacrylate. Polyfunctional compounds may also be used. Polyfunctional compounds are, for example, ethylene glycol dimethacrylate, bisphenol-A diacrylate, bisphenol-A dimethacrylate, 1,4-butanediol dimethacrylate, 1,6-hexanediol dimethacrylate, trimethylolpropane triacrylate, and tetramethylolmethane tetraacrylate. Such monomers and polyfunctional compounds may be used independently or in a combination of two or more.

In one embodiment, the glazing structure includes a barrier layer on the interior or exterior of the transparent flexible film to reduce water and oxygen transmission through the flexible film. Conventional barrier layers including polyvinylidene chloride, polyvinyl alcohol, $SiO_x$ and/or ITO may be used.

Figure 8:
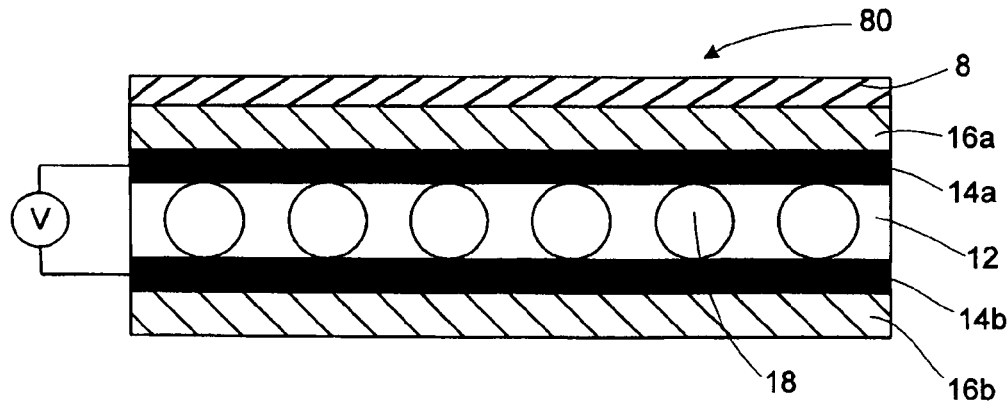
FIG. 8 is a cross-sectional view of the switchable laminate structure of the present invention, including a functional layer overlying the flexible film.

Referring now to FIG. 8, an embodiment of the electro-optical glazing structure 80 of the present invention incorporating a functional layer 8 is illustrated. Depending on the application for which the electro-optical glazing structure is used, one or both of the exterior surfaces of the glazing structure may require a protective coating or layer. For example, the glazing structure may be used in an atmosphere where dew or fog is formed on the glazing structure. The exterior of the glazing structure may accumulate dust or fingerprints, or may be subjected to abrasion. Thus functional layer 8 may comprise, for example, an anti-fog or moisture barrier layer, an anti-bacterial coating, an anti-static coating, an abrasion-resistant coating, and/or a coating with self-cleaning properties. A gas barrier layer, UV blocking/filtering layer, anti-reflection layer, infrared reflection layer or liquid crystal alignment layer may be included as a functional layer within the interior or on the exterior of the glazing structure.

The process for making the electro-optical glazing structure of the present invention includes the steps of (a) providing two transparent substrates coated with a transparent conductive layer, wherein the substrates are separated by spacers to create an area between the substrates (b) depositing a cholesteric liquid crystal (CLC) mixture containing a polymerizable monomer in the area between the substrates, (c) sealing the perimeter of the transparent substrates to contain the CLC mixture with the monomer within the area between the substrates and (d) polymerizing the monomer.

In one embodiment of the present invention, the process is carried out in a substantially continuous operation. The continuous process for making the electro-optical glazing structure includes the steps of (a) providing two substantially continuous flexible transparent substrates coated with a transparent conductive layer, wherein the flexible substrates are separated by spacers to create an area between the flexible substrates (b) continuously depositing a cholesteric liquid crystal (CLC) mixture containing a polymerizable monomer in the area between the substrates, (c) sealing the perimeter of the flexible transparent substrates to contain the CLC mixture with the monomer within the area between the substrates and (d) polymerizing the monomer.

As used herein, the term "substantially continuous" means, with respect to a component of the process, for example the transparent flexible substrate of the glazing structure, such component is provided in a long, continuous condition, such as on a supply roll, from which a plurality of parts may be obtained. The term "substantially" is included in recognition of the fact that a given supply roll must have a finite length. With respect to a process, the term "substantially continuous" is used in its conventional meaning, and means that the operation(s) is/are carried without significant interruption or cessation between steps.

In one embodiment, the flexible transparent substrates are coated with ITO and baked to drive off moisture. The ITO coated surface of one of the substrates is then sprayed with glass bead spacers. The liquid crystal-monomer mixture is then deposited on one of the substrates. The second flexible transparent substrate is laminated to the first substrate so that the liquid crystal-monomer mixture contacts the conductive layer on each of the transparent substrates.

In another embodiment, spacers are included in the CLC mixture and are applied to the transparent flexible substrate when the CLC material is coat deposited or coated onto the flexible substrate.

The CLC material can be coated onto the conductive film by any known method suitable for coating liquid materials. For example, the CLC material may be applied to the conductive film by gravure coating, curtain coating, die-coating, printing and screen printing.

The laminate is prepared by polymerizing he liquid crystal-monomer mixture either in zero electric field or in an electric field effective to align the liquid crystal directors. The polymer network that is created in the material may serve to stabilize the light scattering state resulting from application of a low electric field pulse and the light transmitting state resulting from application of a high electric field pulse.

into individual segments, the epoxy resin proximate to the cut cures, thus sealing the perimeter of the laminate segment.

The electro-optical glazing structures described herein can be stacked and laminated together, in virtually any number or ordering, so as to form composite electro-optical glazing structures having more than two optical states. Such electro-optical glazing structures can be used to construct sophisticated window systems capable of providing complex levels of solar and/or visible radiation control.

EXAMPLES—NORMAL MODE

Comparative Examples 1A and 1B

A normal mode cell, light scattering in the field-off condition and optically clear in the field-on condition, was prepared by using each of the following compositions (% by weight listed):

| | | Optical Properties | | | |
| --- | --- | --- | --- | --- | --- |
| | | Scattering State - Haze (%) | | Clear State - Clarity (%) | |
| Example | Formulation (% by weight) | Low Intensity Curing | High Intensity Curing | Low Intensity Curing | High Intensity Curing |
| 1A | 92.9% TEB 50[1]<br>5.0% RM82[2]<br>2.0% ZLI-4571[3]<br>0.1% Irgacure 819[4] | 78.9 | 77.0 | 86.0 | 87.6 |
| 1B | 95.9% TEB 50<br>2.0% RM82<br>2.0% ZLI-4571<br>0.1% Irgacure 819 | 18.7 | 65.9 | 99.4 | 99.4 |

[1]TEB50: nematic liquid crystal, Slichem Liquid Crystal Company, Ltd, China
[2]RM82: mesogenic monomer, Merck KGaA, Germany
[3]ZLI-4571: chiral compound, Merck KGaA, Germany
[4]Irgacure 819, Bis(2,4,6-trimethylbenzoyl)-phenylphosphineoxide, photoinitiator, Ciba Specialty Chemicals In one embodiment of the present invention, the electro-optical glazing laminate is manufactured in a continuous process that produces a long, continuous roll of the laminate structure. This configuration enables easy customization of electro-optical glazing laminates for light management application.

Segments of the roll, in the desired dimensions, may be die cut from the roll to produce individual "smart window" glazing structures. The perimeter of the die cut segment is then sealed to prevent loss of the CLC material and ingress of oxygen and/or moisture into the structure. Sealing may be carried out by, for example, applying a glue or sealant to the perimeter of the segment, by a thermal process or by activating a chemically reactive material within the laminate structure.

In one embodiment, the CLC material includes encapsulated epoxy resin dispersed therein. The encapsulated epoxy resin may function as the spacers between the conductive layers. Alternatively, the encapsulated epoxy resin is included in the CLC material along with more conventional spacers. Upon die cutting the large laminate material or roll The polymerizable composition was vacuum filled into a cell having two glass substrates coated with indium-tin oxide on their inner surfaces. The glass substrates were separated by 20 micron spacers. The filled cell was irradiated with UV light under different conditions: low intensity curing, exposing the cell to UV light with intensity of 10 mW/cm$^2$ at 365 nm for 1000 seconds and high intensity curing, exposing the cell to UV light with intensity of 100 mW/cm$^2$ 365 nm for 500 seconds. While the cell was being irradiated, an electric field of 111V 60 Hz was applied to the cell.

The optical properties of the cells, % haze in the scattering state and % clarity in the clear state were measured using a BYK-Gardner Haze-Gard Plus Instrument in accordance with ASTM D 1003. The electric field applied to the cells at the time of measurement of optical clarity was $5.55 \times 10^6$ V/m.

Examples 2A–2F

The following series of normal mode cells were prepared substantially in accordance with Examples 1A and 1B above, with the exception that the following compositions including monofunctional monomers were used:

|  |  | Optical Properties | | | |
| --- | --- | --- | --- | --- | --- |
|  |  | Scattering State - Haze (%) | | Clear State - Clarity (%) | |
| Example | Formulation (% by weight) | Low Intensity Curing | High Intensity Curing | Low Intensity Curing | High Intensity Curing |
| 2A | 92.9% TEB 50<br>5.0% IBOA[5]<br>2.0% ZLI-4571<br>0.1% Irgacure 819 | 23.9 | 23.9 | 95.0 | 95.4 |
| 2B | 95.9% TEB 50<br>2.0% IBOA<br>2.0% ZLI-4571<br>0.1% Irgacure 819 | 49.1 | 50.8 | 97.6 | 98.2 |
| 2C | 92.9% TEB 50<br>5.0% IBOMA[6]<br>2.0% ZLI-4571<br>0.1% Irgacure 819 | 93.3 | 93.8 | 99.1 | 99.1 |
| 2D | 95.9% TEB 50<br>2.0% IBOMA<br>2.0% ZLI-4571<br>0.1% Irgacure 819 | 95.1 | 96.1 | 99.3 | 99.2 |
| 2E | 95.9% TEB 50<br>2.0% IDA[7]<br>2.0% ZLI-4571<br>0.1% Irgacure 819 | — | 75.2 | — | 98.9 |
| 2F | 95.9% TEB 50<br>2.0% IDMA[8]<br>2.0% ZLI-4571<br>0.1% Irgacure 819 | — | 78.0 | — | 98.3 |

[5] isobornyl acrylate, Ciba Specialty Chemicals
[6] isobornyl methacrylate, Ciba Specialty Chemicals
[7] isodecyl acrylate
[8] isodecyl methacrylate

Examples 3A–3D

The following series of normal mode cells were prepared substantially in accordance with Examples 1A and 1B above, with the exception that the following compositions including bifunctional monomers were used:

Example 4

A normal mode cell was prepared substantially in accordance with Example 3A above, with the exception that flexible transparent substrates were used. The polymerizable formulation was sandwiched between two 7 mil PET films

|  |  | Optical Properties | | | |
| --- | --- | --- | --- | --- | --- |
|  |  | Scattering State - Haze (%) | | Clear State - Clarity (%) | |
| Example | Formulation (% by weight) | Low Intensity Curing | High Intensity Curing | Low Intensity Curing | High Intensity Curing |
| 3A | 92.9% TEB 50<br>5.0% EGDMA[9]<br>2.0% ZLI-4571<br>0.1% Irgacure 819 | 102.0 | 103.0 | 99.6 | 99.1 |
| 3B | 92.9% TEB 50<br>2.5% EGDMA<br>2.5% IBOMA<br>2.0% ZLI-4571<br>0.1% Irgacure 819 | 101.0 | 100.0 | 99.3 | 99.2 |
| 3C | 92.9% TEB 50<br>5.0% EGDA[10]<br>2.0% ZLI-4571<br>0.1% Irgacure 819 | — | 98.1 | — | 98.8 |
| 3D | 95.9% TEB 50<br>2.0% EGDA<br>2.0% ZLI-4571<br>0.1% Irgacure 819 | — | 103.0 | — | 99.0 |

[9] ethylene glycol dimethacrylate, Aldrich
[10] ethylene glycol diacrylate having a conductive indium-tin oxide coating on their inner surfaces. A uniform cell gap of 20 microns was maintained by pre-mixing into the formulation monodisperse glass microspheres. The cell was irradiated with UV light at an intensity of 100 mW/cm$^2$ 365 nm for 500 seconds. While the cell was being irradiated, an electric field of 111V 60 Hz was applied to the cell.

|  |  | Optical Properties | |
|---|---|---|---|
| Example | Formulation (% by weight) | Scattering State - Haze (%) | Clear State - Clarity (%) |
| 4 | 92.9% TEB 50<br>5.0% EGDMA<br>2.0% ZLI-4571<br>0.1% Irgacure 819 | 102.0 | 97.8 |

EXAMPLES—BISTABLE MODE

Examples 5A–5I

A bistable mode cell was prepared by using each of the following compositions (% by weight listed):

treated with polyimide.) The glass substrates were separated by 20 micron spacers. A 50–80 volt electric field (square or sine waveform) was applied for about 1 second to drive the panels. A frequency of 60 Hz was used to switch the cell to a scattering state. Frequencies higher than the threshold frequency was required to switch the cell to an optically clear state. The lower the frequency, the less the power requirement to drive the device.

The bistability rating is based on the length of time the haze state remained after switching. An indication of "good" means that the cell remained hazy for at least a day or longer; an indication of "fair" means that the cell remained hazy for between one-half hour to several hours; and an indication of "no" means that the cell remained hazy for less than 10 minutes.

Example 6

A bistable mode cell was prepared substantially in accordance with Example 5A–5J above, with the exception that flexible transparent substrates were used. The liquid crystal formulation was sandwiched between two 7 mil PET films having a conductive indium-tin oxide coating on their inner

| Example | Formulation | Threshold Frequency (kHz) | Optical Property | | Bistability |
|---|---|---|---|---|---|
| | | | Haze | Clarity | |
| 5A | 97.8% ZLI-4788-000[11]<br>2.0% ZLI-4572[12]<br>0.2% tetrabutylammonium tetraphenyl borate | 2.5 | Good | Good | Fair |
| 5B | 97.8% ZLI-4788-000<br>2.0% ZLI-4572<br>0.2% 006 g 2-propylisoquinolinium bromide | 2.5 | Good | Good | Fair |
| 5C | 97.8% ZLI-4788-000<br>2.0% ZLI-4572<br>0.2% Tetrabutylammonium bromide | 20 | Good | Good | Good |
| 5D | 97.8% ZLI-4788-000<br>2.0% ZLI-4572<br>0.2% Tetrabutylammonium hexafluoro phosphate | 25 | Good | Good | Good |
| 5E | 97.8% ZLI-4788-000<br>2.0% ZLI-4572<br>0.2% Tetrabutylammonium p-toluene sulfonate | 25 | Good | Good | Good |
| 5F | 97.8% ZLI-4788-000<br>2.0% ZLI-4572<br>0.2% Tetrakis(decyl)ammonium Bromide | 20 | Good | Good | Good |
| 5G | 97.8% ZLI-4788-000<br>2.0% ZLI-4572<br>0.2% Tetrahexadecylammonium Bromide | 2 | Good | Good | Good |
| 5H | 97.0% ZLI-4788-100[13]<br>2.0% ZLI-4572<br>1.0% 1-bromohexadecane | 1 | Good | Good | No |
| 5I | Same as 5H, but the substrates were treated by polyimide SE-1211 | 1 | Good | Good | No |

[11]Negative type liquid crystal, Merck, Germany
[12]Chiral compound, Merck, Germany
[13]Negative type liquid crystal, Merck, Germany The composition was filled into a cell having two glass substrates coated with indium-tin oxide on their inner surfaces. (In Example 5I, the conductive ITO layers were surfaces. A uniform cell gap of 25 microns was maintained by pre-mixing into the formulation monodisperse glass microspheres.

| Example | Formulation | Threshold Frequency (kHz) | Optical Property | | Bistability |
|---|---|---|---|---|---|
| | | | Haze | Clarity | |
| 6 | 97.7% ZLI-4788-000<br>2.0% ZLI-4572<br>0.3% 2-propylisoquinolinium bromide | 2.0 | Good | Good | Fair |

Examples 7A–7M

A bistable mode cell was prepared by using each of the following compositions containing a mesogenic monomer (% by weight listed). The mesogenic monomer (RM82 from Merck) has the following structure:

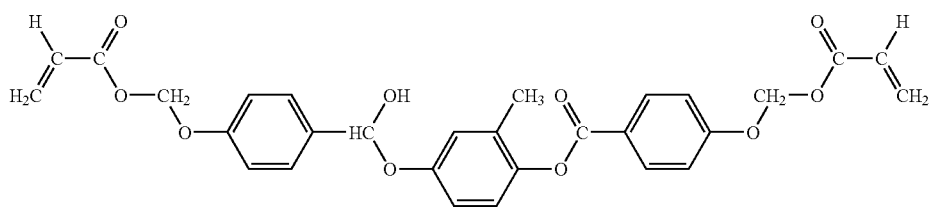

| Example | Formulation | Threshold Frequency (kHz) | Optical Property | | Bistability |
|---|---|---|---|---|---|
| | | | Haze | Clarity | |
| 7A | 95.7% ZLI-4788-000<br>2.0% ZLI-4571<br>0.1% tetrabutylammonium tetraphenyl borate<br>2.0% reactive mesogen RM82<br>0.2% photoinitiator Benzoin methyl ether | 3 | Good | Fair | Good |
| 7B | 95.6% ZLI-4788-000<br>2.0% ZLI-4571<br>0.2% tetrabutylammonium tetraphenyl borate<br>2.0% RM82<br>0.2% Benzoin methyl ether | 2.5 | Good | Fair | Good |
| 7C | 97.2% ZLI-4788-000<br>2.0% ZLI-4571<br>0.2% tetrabutylammonium tetraphenyl borate<br>0.5% RM82<br>0.1% Benzoin methyl ether | 2.5 | Good | Good | Fair |
| 7D | 96.7% ZLI-4788-000<br>2.0% ZLI-4571<br>0.2% tetrabutylammonium tetraphenyl borate<br>1.0% RM82<br>0.1% Benzoin methyl ether | 2 | Good | Good | Fair |
| 7E | 94.5% ZLI-4788-000<br>2.0% ZLI-4571<br>0.2% tetrabutylammonium tetraphenyl borate<br>3.0% RM82<br>0.3% Benzoin methyl ether | 4 | Good | Good | No |
| 7F | 95.5% ZLI-4788-000<br>2.0% ZLI-4572<br>0.3% 2-propylisoquinolinium bromide<br>2.0% RM82<br>0.2% Benzoin methyl ether | 25 | Good | Good | Good |
| 7G | 95.5% ZLI-4788-000<br>2.0% ZLI-4572<br>0.3% 1-heptyl-4(4-pyridyl)-pyridinium bromide<br>2.0% RM82<br>0.2% Benzoin methyl ether | 0.8 | Fair | Good | Good |

-continued

| Example | Formulation | Threshold Frequency (kHz) | Optical Property Haze | Clarity | Bistability |
|---|---|---|---|---|---|
| 7H | 94.8% ZLI-4788-000<br>2.0% ZLI-4572<br>1.0% 2-propylisoquinolinium-tetraphenyl borate<br>2.0% RM82<br>0.2% Benzoin methyl ether | 4 | Fair | Good | Good |
| 7I | 95.5% ZLI-4788-000<br>2.0% ZLI-4571<br>0.3% Dodecyl pyridinium tetraphenyl borate<br>2.0% RM82<br>0.2% Benzoin methyl ether | 5 | Good | Good | Good |
| 7J | 95.2% ZLI-4788-000<br>2.0% ZLI-4571<br>1.0% 1-bromohexadecane<br>1.5% RM82<br>0.3% Benzoin methyl ether | 0.5 | Good | Good | Good |
| 7K | 87.6% ZLI-4788-000<br>9.0% CB15<br>1.0% Tetrabutylammonium tetraphenyl borate<br>2.0% RM82<br>0.4% Benzoin methyl ether | 5 | Fair | Good | Good |
| 7L | Same as 7K, but filled into panels consisting of polyimide SE-3510 coated glass substrates | 5 | Good | Good | Good |
| 7M | Same as 7K, but filled into panels consisting of polyimide SE-1211 coated glass substrates | 5 | Fair | Fair | Fair |

The composition was filled into a cell having two glass substrates coated with indium-tin oxide on their inner surfaces. (In Examples 7L and 7M, the conductive ITO layers were treated with polyimide.) The glass substrates were separated by 20 micron spacers. The polymerizable compositions were cured by exposing the cells to irradiation with UV light at an intensity of 5 mW/cm$^2$ at 365 nm for 200 seconds. Before curing, the cells were turned to an optically clear state by applying a high frequency field, e.g., 50 Vrms at, e.g., 3 kHz, or other means that include the planar surface alignment. A 50–80 volts electric field (square or sine waveform) was applied for about 1 second to drive the cells. Some cells were actually driven by 25 volts electrical field. Typically, 60 Hz electric field turns the cells to a hazy state. An electric field having a frequency higher than the threshold frequency switches the cells to an optically clear state.

Example 8

A bistable mode cell was prepared substantially in accordance with Examples 7A–7M above, with the exception that flexible transparent substrates were used. The liquid crystal formulation was sandwiched between two 7 mil PET films having a conductive indium-tin oxide coating on their inner surfaces. A uniform cell gap of 25 microns was maintained by pre-mixing into the formulation monodisperse glass microspheres. The liquid crystal composition was cured by exposing the cell to UV light having an intensity of 5 mW/cm$^2$ at 365 nm for 200 seconds. Prior to curing, the cells were turned to an optically clear state by applying a high frequency field. A 50–80 volt electric field (square or sine waveform) was applied for about 1 second to drive the cell. A frequency of 60 Hz was used to switch the cell to a scattering state. A frequency higher than the threshold frequency was required to switch the cell to the optically clear state.

| Example | Formulation | Threshold Frequency (kHz) | Optical Property Haze | Clarity | Bistability |
|---|---|---|---|---|---|
| 8 | 95.5% ZLI-4788-000<br>2.0% g ZLI-4572<br>0.3% 2-propylisoquinolinium bromide<br>2.0% RM82<br>0.2% Benzoin methyl ether | 3.0 | Good | Fair | Good |

While not wishing to be bound by theory, it is believed that the addition of an ionic compound improves the stability of the bistable electro-optical device. It is believed that the doping of the ionic compound reduces the conductivity and hence increases the threshold frequency to a desirable range. The nature of ionic conductivity differs from electron conductivity and responds differently to the frequency of the applied electric field.

At low frequency, e.g., 60 Hz, the conductivity assumes the dominant role. Due to the positive ionic conductivity anisotropy of the liquid crystal mixture, the liquid crystal molecules tend to align along the external electric field. Such molecular alignment favors the focal conic texture, i.e., an optically scattering state. As one of the stable states of the cholesteric texture, the hazy state can be kept without an applied electric field.

At the higher frequency, i.e., above the threshold frequency, the dielectric behavior is believed to be more dominant. Due to the negative dielectric anisotropy of the liquid crystals, the liquid crystal molecules tend to align perpendicularly to the external electric field, i.e., build in the planar texture. The planar texture is transparent to the visible light. It is the optically clear state. The clear state is another stable cholesteric texture that can be maintained without an applied field for a long time.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. A bistable electro-optical device comprising:
    a first transparent substrate, having an interior and exterior surface;
    a second transparent substrate, having an interior and exterior surface;
    a transparent electrically conductive layer on the interior surface of each of the first and second flexible substrates;
    a cholesteric liquid crystal material comprising a nematic liquid crystal material, a chiral material and an ionic additive, wherein the cholesteric liquid crystal material comprises a polymeric matrix having cholesteric liquid crystals stabilized and supported therein and is positioned between the electrically conductive layers of the first and second transparent flexible substrates;
    wherein the first and second transparent substrates are spaced apart a predetermined distance; and
    wherein the cholesteric liquid crystal material is switched from a transparent state to a light scattering state and from a light scattering state to a transparent state upon application of an electric field to the cholesteric liquid crystal material, and wherein an electric field is not required to maintain either the transparent state or the light scattering state.

2. The electro-optical device of claim 1 wherein the polymer matrix is formed from a polymerizable monomer or polymer.

3. The electro-optical device of claim 1 wherein the cholesteric liquid crystal material comprises about 90–99% by weight nematic liquid crystal material, about 0.5–3% by weight of chiral dopant and about 0.05–0.5% by weight of ionic additive.

4. The electro-optical device of claim 1 wherein the ionic additive comprises an ionic compound.

5. The electro-optical device of claim 1 wherein the ionic additive comprises a charge transfer agent.

6. The electro-optical device of claim 1 wherein the first and second transparent substrates comprise a flexible polymeric film.

7. The electro-optical device of claim 1 wherein the interior surface of at least one of the first and second transparent substrates has a plurality of alignment surface profiles thereon.

8. The electro-optical device of claim 1 wherein the interior of the conductive layer of at least one of the first and second transparent substrates has a plurality of alignment surface profiles thereon.

9. The electro-optical device of claim 1 further comprising a protective layer on at least one of the first and second flexible substrates.

10. The electro-optical device of claim 1 further comprising a barrier layer on at least one of the first and second flexible substrates.

11. The electro-optical device of claim 10 wherein the barrier layer comprises a moisture barrier layer.

12. The electro-optical device of claim 1 wherein the cholesteric liquid crystal material further comprises a plurality of spacers.

13. The electro-optical device of claim 1 wherein the cholesteric liquid crystal material further comprises a dye.

14. The electro-optical device of claim 1 wherein the distance between the first and second transparent substrates is greater than about 10 microns.

* * * * *